June 24, 1941.  F. LAUCK  2,246,738

MEANS FOR MOUNTING GYROS

Filed April 19, 1939

INVENTOR.
Friedrich Lauck
BY
Stephen Cerstvik
ATTORNEY.

Patented June 24, 1941

2,246,738

UNITED STATES PATENT OFFICE 2,246,738

MEANS FOR MOUNTING GYROS

Friedrich Lauck, Lubeck-Travemunde, Germany, assignor to Siemens Apparate und Maschinen Gesellschaft mit beschränkter Haftung, Berlin, Germany, a corporation of Germany Application April 19, 1939, Serial No. 268,842
In Germany April 14, 1938

4 Claims. (Cl. 308—159)

This invention relates to gyros, and more particularly to means for mounting gyros.

In connection with gyro apparatus suspended in a mounting providing one or more degrees of freedom, one of which is about a vertical axis, difficulties have heretofore been encountered in satisfactorily absorbing vibrations occurring in the direction of said vertical axis. Inasmuch as the gyro is widely used for navigation and control purposes upon moving platforms or vehicles such as aircraft, it is subject to axial vibrations caused by rapid changes of attitude of the vehicle. The gyro is subject to additional axial vibrations caused by the gyro rotor which may oscillate when rotating at its normally high angular velocities. The above-mentioned difficulties are particularly annoying in connection with the mounting of gyro devices in aircraft. A rigid or unyielding mounting can easily result in damage to, and under certain circumstances in the destruction of, the apparatus.

One of the objects of the present invention is to provide novel means for supporting the weight and absorbing oscillations of a gyro apparatus.

Another object of the invention is to provide novel means of the above character for absorbing oscillations in an axial direction of a vertical shaft of a gyro mounting.

A further object is to provide a gyro arrangement embodying novel yielding bearing means for a vertical shaft thereof.

An additional object is to provide a novel and inexpensive means for enabling a rapid positioning of a portion of the gyro apparatus upon a gimbal frame.

The above and further objects and novel features will more fully appear when the same are read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the several views, Fig. 1 is a perspective view partly in section and with parts broken away illustrating one embodiment of the invention;

The forms of the invention illustrated in the accompanying drawing, by way of example, comprise means for yieldingly supporting the weight of a gyro rotor suspended in a mounting having one or more degrees of freedom and having a vertical shaft which is adapted for resting upon said means. Suitable damping means are provided for quickly and smoothly arresting any oscillations of said shaft which occur in an axial direction. In order to facilitate mounting a preferably freely suspended gyro in a vertical gimbal frame, a bearing perforation in the frame is provided which is in communication with a slot in the frame which reaches to an edge thereof.

Figure 1:
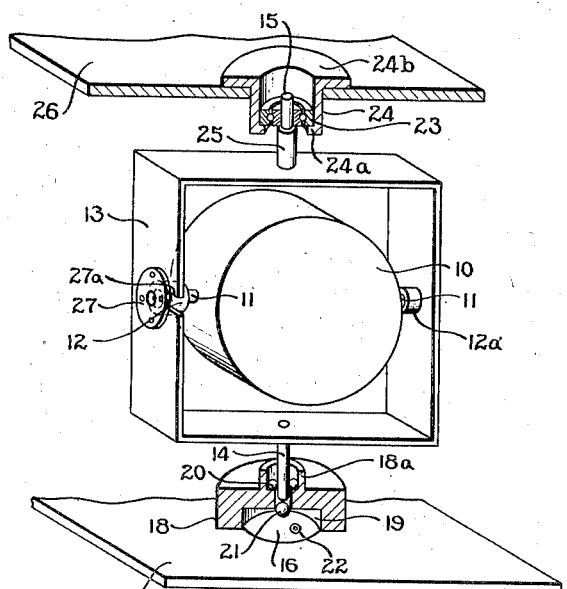

In the form shown in Fig. 1, the novel resilient mounting is employed in combination with an azimuth gyro for navigation and control purposes of vehicles such as aircraft. A gyro rotor (not shown) is mounted with the axis of rotation thereof horizontal, in a housing 10 having trunnions 11 which are rotatably supported in bearings 12 and 12a in a gimbal frame 13, the latter having vertical trunnions 14, 15.

As above mentioned, in order to absorb resiliently the axial vibrations or oscillations of apparatus of this character having a vertical supporting shaft, novel means are provided therefor comprising in the embodiment of Fig. 1 a yielding footstep bearing which is constituted by a resilient dome member 16 of a suitable elastic material, the open lower face of which is securely attached to a base plate 17. Surrounding the member 16 is a cap element 18 having a chamber 19 therein for the dome member, and also having a vertical central sleeve 18a through which the shaft or lower vertical trunnion 14 extends. A ball race for a collar bearing is provided in said sleeve for balls 20 which maintain the trunnion 14 in a central position therein above a ball 21, the latter being interposed between the dome member 16 and the lower face of the trunnion in order to reduce the friction which ordinarily would exist therebetween. The lower face of said trunnion is preferably convex and of case hardened metal.

The dome member 16 is preferably hollow and filled with air which provides an air cushion for the apparatus. In order to provide suitable damping means for the above explained axial vibrations, means for regulating the cushioning effect of the yielding member are provided comprising an aperture 22 therein.

The upper vertical trunnion 15 of the gimbal frame is arranged in an axially displaceable manner by means of a collar bearing 23 which is axially movable within a sleeve 24. The collar bearing is preferably a ball bearing and is normally supported at the central margin thereof by a sleeve 25 which closely surrounds trunnion 15. An inwardly extending flange 24a prevents the bearing from dropping out of the sleeve 24, for example, in the event that a part of the housing, for example an upper plate 26, is lifted. Said sleeve rests in a perforation in the upper plate upon a flange 24b integral with the sleeve.

To facilitate the installation of the gyro in the gimbal frame, there is provided in accordance with the invention, a slotted bearing perforation 27 which enables the rapid placing of the trunnions 11 in their bearings, one of said trunnions being placed in the bearing 12a, opposite the slotted perforation, and the other trunnion being moved through a slot 27a in the gimbal frame into its proper position at which time the bearing 12 is inserted in the perforation, thus surrounding the shaft and providing a support therefor.

Figure 2:
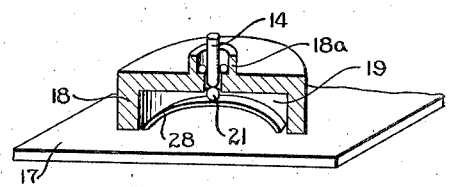
Fig. 2 is a perspective view partly in section illustrating a second embodiment of the invention.
Figure 3:
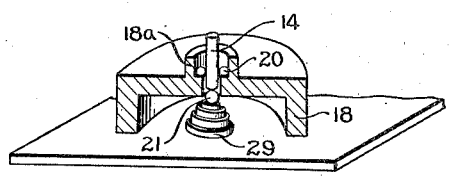
Fig. 3 is a perspective view, partly in section, showing a third embodiment of the invention; and, Fig. 4 is a perspective view, partly in section, illustrating a fourth embodiment of the invention.

In the embodiment shown in Figs. 2 and 3, a footstep bearing only is illustrated, the remainder of the apparatus being identical with that of the first embodiment. Further, the footstep bearings of Figs. 2 and 3 are similar to that of Fig. 1 with the exception of the resilient member which absorbs the axial vibrations of trunnion 14, and upon which the weight of the gyro apparatus rests. The resilient member of Fig. 2 comprises a saddle spring 28 which may be constituted by one or more laminations, the latter being combined to form an arch at the central portion thereof, the extremities slidably engaging the base portion 17.

The resilient member of the embodiment of Fig. 3 comprises a spring tube 29, i. e. a spring constituted by a helix, the turns of which have a face substantially parallel to the axis of the spring, which face is of greater height than the thickness thereof, measured radially. The coils or turns of the spring tube are preferably in close engagement in order to form an air chamber within the tube. The upper and lower extremities of the tube are sealed by suitable means (not shown).

Figure 4:
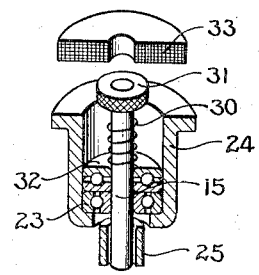

In the embodiment of Fig. 4, instead of a resilient footstep bearing a novel resilient upper collar bearing is provided. Only the latter bearing is illustrated, the remainder of the apparatus being similar to that of Fig. 1 with the exception that a footstep bearing is not employed but instead only a lower collar bearing which permits free axial displacement thereof. The novel resilient collar bearing comprises a counterspring 30 which surrounds the trunnion 15 and which is interposed between an adjustable nut 31, which is axially displaceable upon a threaded upper portion of the trunnion, and a suitable thrust bearing 32. The latter rests upon the above mentioned upper collar bearing 23. By adjusting the axial position of the nut 31, the tension of the spring 30 can be regulated as desired. In order to damp oscillations in the apparatus, the spring is preferably subjected to a strong magnetic field of a magnet 33, for example, an electro-magnet, which may be arranged above the spring whereby the axis of the trunnion and of the field substantially coincide.

There is thus provided novel means for avoiding damaging effects upon a gyro apparatus caused by oscillations thereof when the apparatus is supported by vertical trunnions. The means are further effective to dampen and yieldingly absorb said vibrations.

Although only four embodiments of the present invention have been illustrated and described in detail, it is to be expressly understood that the same is not limited thereto; for example, the vertical trunnions which are supported in the novel manner above described may comprise the trunnions of a gyro rotor. The gyro rotor may have one or more degrees of freedom. Thus, the gyro may be employed as a gyro horizon, or as bank or turn indicator. For damping the oscillations occurring in the direction of the vertical axis, there may be provided damping means different from those described, for example, hydraulic, pneumatic, electric or frictional damping means may be employed. Further, the ball 21 which is normally interposed between trunnion 14 and the resilient member may be eliminated. Various changes in the design and arrangements of the parts may be made without departing from the spirit and scope of the invention as the same will now be understood by those skilled in the art. For a definition of the limits of the invention, reference will be had primarily to the appended claims.

What is claimed is:

1. In combination, a gyro gimbal trunnion, a cap member having an upper sleeve portion formed integrally therewith and a chamber defined by its base portion communicating with the sleeve portion, means defining a resilient bearing member mounted and confined within the chamber defined by the base portion of said cap member, a ball bearing resting on said resilient bearing member, said trunnion being received by said sleeve portion and resting upon said ball bearing whereby axial movements of said trunnion are transferred to and imparted by said ball bearing to said resilient bearing member to be absorbed by the latter bearing, and bearing means carried by said sleeve portion for engaging said trunnion and maintaining the latter in a vertical position.

2. In combination, a gyro gimbal ring trunnion, a cap member having an upper sleeve portion formed integrally therewith and a chamber defined by its base portion, said cap member being further provided with an annular passage joining the interior of said sleeve portion and the chamber defined by the base portion of said cap member, means defining a yielding footstep bearing mounted and confined within the chamber, a ball bearing resting upon said footstep bearing, said trunnion passing through said sleeve portion and annular passage for normally contacting said ball bearing whereby axial movements of said trunnion are absorbed by said yielding footstep bearing, and further ball bearings carried by said sleeve portion for contacting said trunnion and maintaining the latter in a vertical position.

3. In combination, a gyro gimbal ring trunnion, a cap member having an upper sleeve portion formed integrally therewith and a chamber defined by its base portion, said cap member being further provided with an annular passage joining the interior of the sleeve portion and the chamber defined by the base portion of said cap member, a yielding footstep bearing defining a closed hollow chamber having fluid therein mounted in the chamber defined by the base portion of said cap member, a ball bearing resting on said footstep bearing, said trunnion passing through said sleeve portion and annular passage to normally contact said ball bearing whereby axial movements of said trunnion are absorbed by said yielding footstep bearing, bearing means mounted in said sleeve portion for engaging said trunnion and maintaining the latter in a vertical position, and means formed with said footstep bearing for restricting fluid flow from the closed hollow chamber of said footstep bearing during axial displacement of said trunnion.

4. In combination, a gyro gimbal ring trunnion, a cap member having an upper sleeve portion formed integrally therewith and a chamber defined by its base portion, said cap member being further provided with an annular passage joining the interior of the sleeve portion and the chamber defined by the base portion of said cap member, a yielding footstep bearing defining a closed hollow chamber having fluid therein mounted in the chamber defined by the base portion of said cap member, bearing means resting on said footstep bearing, said trunnion passing through said sleeve portion and annular passage to normally contact said bearing means whereby axial movements of said trunnion are absorbed by said yielding footstep bearing, other bearing means mounted in said sleeve portion for engaging said trunnion and maintaining the latter in a vertical position, and means restricting fluid flow from the closed hollow chamber of said footstep bearing during axial displacement of said trunnion.

FRIEDRICH LAUCK.